No. 669,299. Patented Mar. 5, 1901.
N. C. BASSETT.
DYNAMO ELECTRIC MACHINE.
(Application filed Dec. 12, 1899.)
(No Model.) 2 Sheets—Sheet 1.
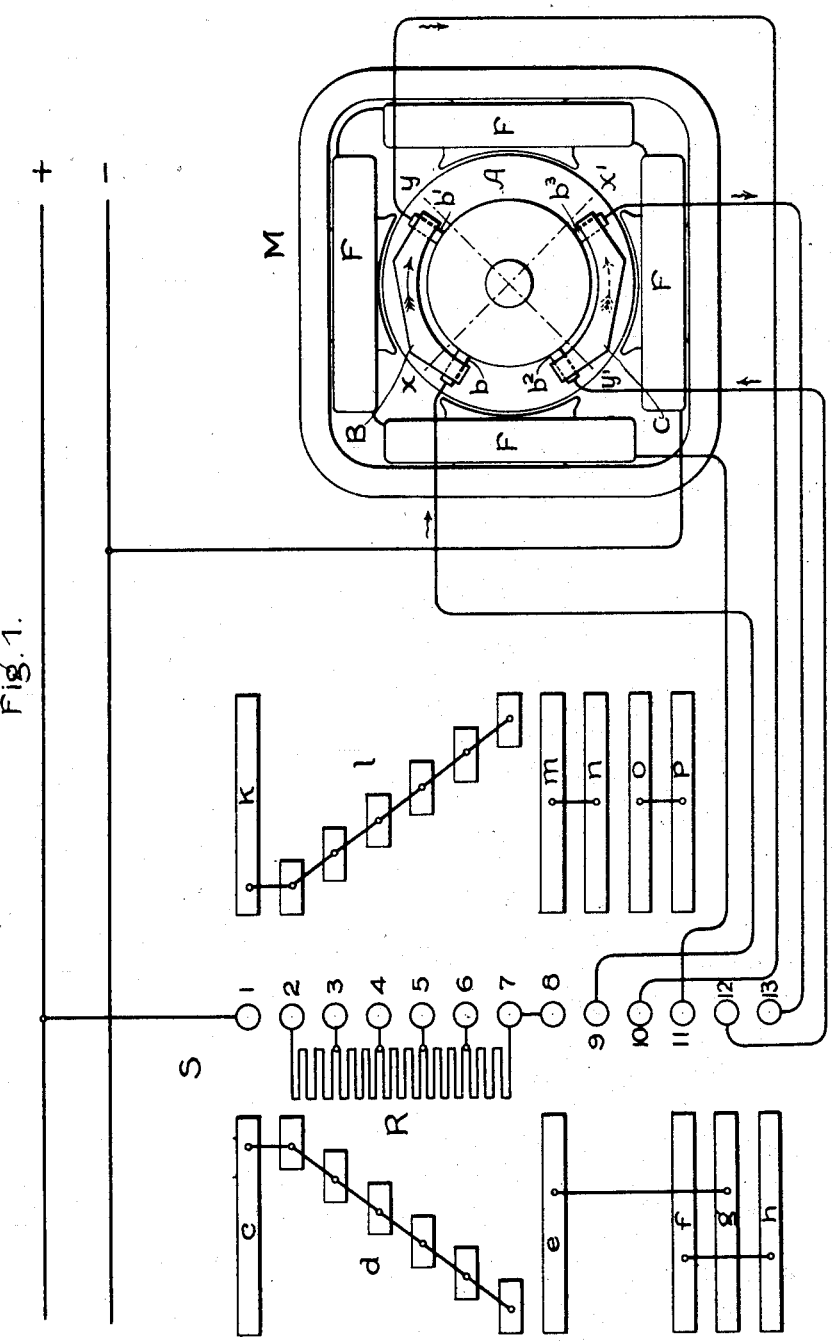
Witnesses.
Arthur H. Abell.
A. F. Macdonald.
Inventor.
Norman C. Bassett,
by Albert G. Davis
Atty.

No. 669,299. Patented Mar. 5, 1901.
N. C. BASSETT.
DYNAMO ELECTRIC MACHINE.
(Application filed Dec. 12, 1899.)
(No Model.) 2 Sheets—Sheet 2.
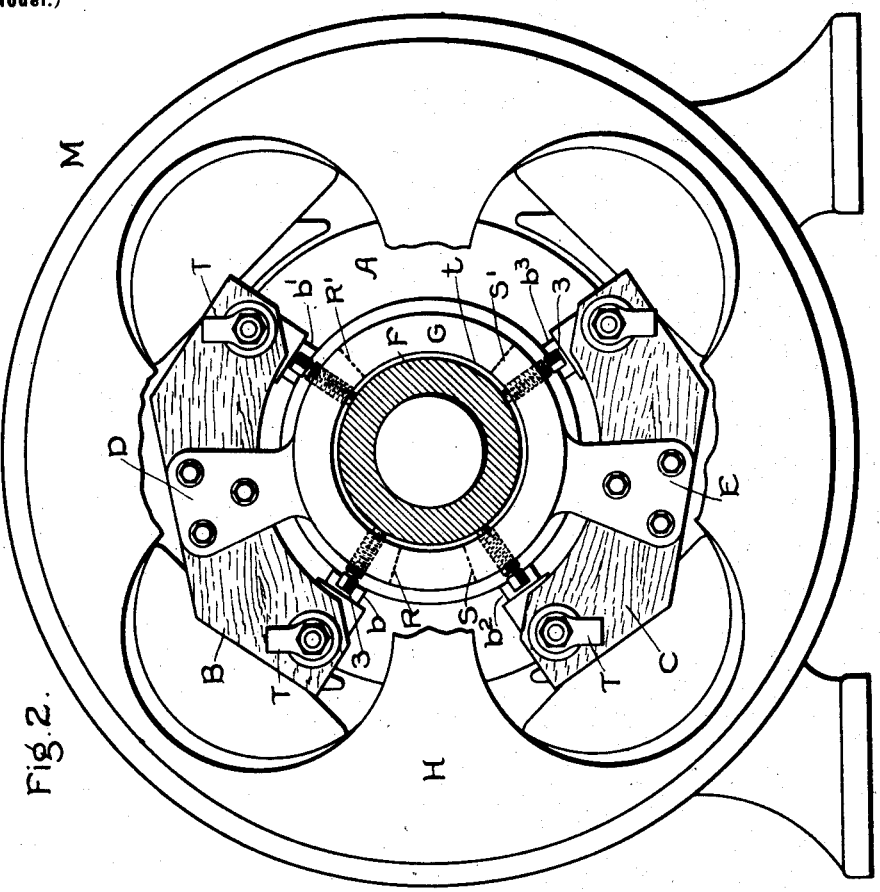
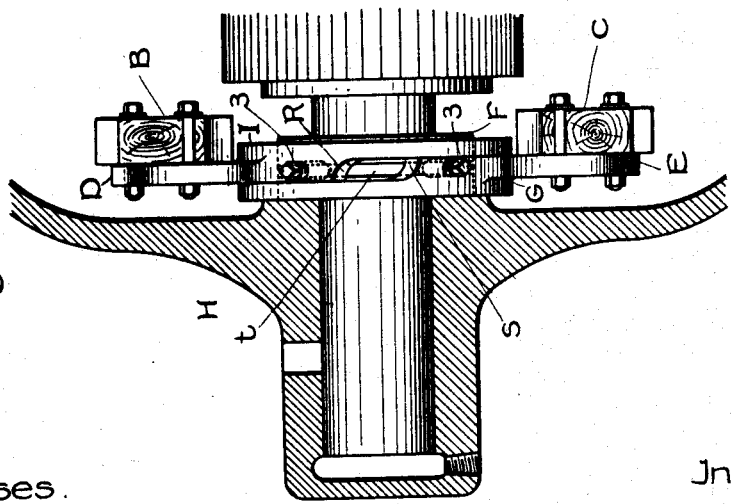
Witnesses.
Lewis P. Abell.
A. F. Macdonald.
Inventor
Norman C. Bassett.
by Albert G. Davis
Atty
THE NORRIS PETERS CO., PHOTO-LITHO., WASHINGTON, D. C.

UNITED STATES PATENT OFFICE.

NORMAN C. BASSETT, OF LYNN, MASSACHUSETTS, ASSIGNOR TO GENERAL ELECTRIC COMPANY, OF NEW YORK.

DYNAMO-ELECTRIC MACHINE.

SPECIFICATION forming part of Letters Patent No. 669,299, dated March 5, 1901.

Application filed December 12, 1899. Serial No. 740,032. (No model.)

*To all whom it may concern:*

Be it known that I, NORMAN C. BASSETT, a citizen of the United States, residing at Lynn, county of Essex, State of Massachusetts, have invented certain new and useful Improvements in Dynamo-Electric Machines, (Case No. 1,085,) of which the following is a specification.

My invention relates to dynamo-electric machines of the direct-current type, and particularly to motor systems in which it is desired to reverse the direction of motion of the rotary members of the motors.

My invention will be understood by reference to the following description, taken in connection with the accompanying drawings, while its scope will be pointed out in the appended claims.

In the drawings, Figure 1 represents in diagram a motor and a controlling-switch or controller arranged according to my invention. Fig. 2 is a view of a motor of the inclosed type, the head being broken away in part to show the arrangement of the brush-holders; and Fig. 3 is a view, partly in cross-section, for showing the mounting of the brush-holding yokes on the inside of the head.

Referring to Fig. 1, M represents a four-pole motor of the direct-current type, having field-windings F and an armature A, which latter is so wound that but two brushes, spaced ninety degrees apart on the commutator, are required to conduct the currents to and from the armature-winding. As heretofore constructed such motors have been provided with a single pair of brushes so positioned as to bear upon the commutator along the dotted lines $x\,x'$ and $y\,y'$ midway between the field-poles. Such a construction demands a magnetic field of such density that the shifting of the line of commutation to the one side or the other of the line of contact of the brushes, due to the reaction of the armature-currents, is reduced to a minimum. It also requires a small number of turns per armature-coil, for the reason that the said coil is short-circuited at the point of commutation in a stronger magnetic field than would be the case if the brushes could be set at the most favorable point for commutation.

The field distortion due to the armature reaction operates to shift the line of commutation backward in a direction opposite to the direction of rotation of the armature, so that for rotation in a clockwise direction the most favorable position for the brushes is to the left of the lines $x\,x'$ and $y\,y'$, Fig. 1, if the brushes are positioned on the upper half of the commutator and to the right of said lines if positioned on the lower side, while for rotation in a counter clockwise direction the most favorable position is to the right of the lines $x\,x'$ and $y\,y'$ if the brushes are placed on the upper side of the commutator and to the left of said lines if placed on the lower. I therefore arrange two sets of brushes $b\,b'$ and $b^2\,b^3$ so that they bear on the commutator on opposite sides of the lines $x\,x'$ and $y\,y'$, and in the type of motor shown in the drawings I find it convenient to place one set on the upper side and the other set on the lower side of the commutator. Connections are made from each of the several commutator-brushes to fixed contacts on a switch S of the controller type. One terminal of the field-winding is connected directly to the source and the other to a fixed contact on the aforesaid switch. The controller-switch S is of the ordinary type and comprises a set of fixed contacts 1 to 13 and two sets of movable contact-plates, which are shown developed on a plane surface, although in practice it is customary to place the said contacts on the surface of a revoluble cylinder. If this controller is so moved that the contact-plates to the right are brought under the fixed contacts, the circuit will be as follows: from the positive main to the contact 1, through the resistance R, which is gradually cut out by the movement of the said controller, to contact 8, through contact-plates $m$ and $n$ to contact 9, to brush $b$, through the winding of the armature to brush $b'$ to contact 10, through the contact-plates $o$ and $p$ to contact 11, and through the field-coils F to the negative main, the brushes $b^2$ and $b^3$ being open-circuited at the contacts 12 and 13. The motor is now connected for rotation in a clockwise direction, as indicated by the full-line arrow on the upper side of the armature, and the brushes $b$ and $b'$, through which the armature-current flows, are in the most favorable position for clockwise or forward rotation, while the brushes $b^2$ and $b^3$ are entirely out of circuit. If now it is desired to connect the motor for rotation in a counter clockwise direction, the controller is brought back to the off position and is then moved in the opposite direction until the contact-plates to the left are brought under the fixed contacts. The circuit will then be as follows: from the positive main to the contact 1, through the resistance R, which, as before, is gradually cut out by the movement of the said controller, to contact 8, through contact-plates $e$ and $g$ to contact 12, brush $b^2$, through the winding of the armature in the opposite direction to brush $b^3$, to contact 13, through contact-plates $h$ and $f$ to contact 11, and through the field-coils F in the same direction as before to the negative main, the brushes $b$ and $b'$ being now open-circuited at the contacts 9 and 10. The motor is now connected for rotation in a counter clockwise direction, as indicated by the dotted arrow at the lower side of the armature, and the brushes $b^2$ $b^3$, through which the armature-current now flows, are in the most favorable position for counter clockwise rotation, while the brushes $b$ and $b'$ are entirely out of circuit.

In Figs. 2 and 3 I have shown a motor of the inclosed type with brushes arranged in accordance with my invention. In Fig. 2 the central portion of the front inclosing shield or head H is broken away, so that the mounting of the brushes may be seen. The upper set of brushes is supported from the brush-holder B, which is bolted to the yoke D. The lower set is in like manner supported from the brush-holder C, bolted to the yoke E. The yokes D and E are each provided with a ring-shaped portion encircling a projection F on the head H, from which they are supported, and the two ring-shaped portions are cut away at R R' and S S', so that they overlie each other and are capable of adjustment relatively to each other around the projection F. This projection is grooved at $t$ to receive the set-screws 3, by means of which the yokes are clamped in position.

Although I have shown my invention as applied to a multipolar dynamo-electric machine in which the field-coils are connected in series with the armature-winding and although it is particularly advantageous in such an organization, it is evident that it may be used in a machine having any number of poles and that the field may be either series, shunt, or separately excited.

What I claim as new, and desire to secure by Letters Patent of the United States, is—

1. In combination, a motor provided with two sets of commutator-brushes, one set properly positioned for rotation in a clockwise direction and the other set for rotation in a counter clockwise direction, a controller for said motor, and contacts on said controller for closing the motor-circuit through either of said sets of brushes.

2. In combination, a motor provided with two sets of commutator-brushes, means for adjusting said brushes, and a controller for said motor comprising means for controlling the speed of the motor, and means for closing the motor-circuit through either of the two sets of brushes.

3. A motor provided with two sets of commutator-brushes in combination with a controller provided with contacts for regulating the speed of said motor, and contacts for closing the motor-circuit through either of said sets of brushes.

4. A motor provided with two sets of commutator-brushes, a controller for said motor, a rheostat for said controller, said controller being provided with contacts for cutting the said rheostat in and out of the motor-circuit, and for closing the motor-circuit through one or the other of said sets of brushes.

In witness whereof I have hereunto set my hand this 9th day of December, 1899.

NORMAN C. BASSETT.

Witnesses:
DUGALD MCKILLOP,
HENRY O. WESTENDARF.